(12) United States Patent
Kitabayashi et al.

(10) Patent No.: US 8,548,013 B2
(45) Date of Patent: Oct. 1, 2013

(54) FIBER LASER

(75) Inventors: Tomoharu Kitabayashi, Sakura (JP);
Tetsuya Sakai, Sakura (JP); Michihiro Nakai, Sakura (JP)

(73) Assignee: Fujikara Ltd., Tokyo (JP)

( * ) Notice: Subject to any disclaimer, the term of this patent is extended or adjusted under 35 U.S.C. 154(b) by 332 days.

(21) Appl. No.: 12/496,200

(22) Filed: Jul. 1, 2009

(65) Prior Publication Data
US 2009/0274175 A1 Nov. 5, 2009

Related U.S. Application Data

(63) Continuation of application No. PCT/JP2008/052168, filed on Feb. 8, 2008.

(30) Foreign Application Priority Data

Feb. 9, 2007 (JP) ................................ 2007-030274
Aug. 22, 2007 (JP) ................................ 2007-216473

(51) Int. Cl.
*H01S 3/30* (2006.01)
(52) U.S. Cl.
USPC .................................................. 372/3; 372/6
(58) Field of Classification Search
USPC .......................................................... 372/3, 6
See application file for complete search history.

(56) References Cited

U.S. PATENT DOCUMENTS

| | | | |
|---|---|---|---|
| 3,657,554 A | 4/1972 | Lumpkin et al. | |
| 5,033,051 A * | 7/1991 | Werner | 372/3 |
| 5,272,717 A * | 12/1993 | Stultz | 372/3 |
| 6,556,342 B1 * | 4/2003 | Ellison et al. | 359/334 |
| 6,885,683 B1 * | 4/2005 | Fermann et al. | 372/25 |
| 2005/0078714 A1 * | 4/2005 | Komine | 372/3 |
| 2005/0141582 A1 * | 6/2005 | Lee et al. | 372/84 |
| 2006/0198397 A1 * | 9/2006 | Korolev et al. | 372/3 |
| 2006/0251369 A1 * | 11/2006 | Shaw et al. | 385/125 |

FOREIGN PATENT DOCUMENTS

| | | |
|---|---|---|
| JP | 58-070140 A | 4/1983 |
| JP | 03032091 A | 2/1991 |
| JP | 2753539 B2 | 5/1998 |
| JP | 2002006348 A | 1/2002 |
| JP | 2003143081 A | 5/2003 |

(Continued)

OTHER PUBLICATIONS

G. Bouwmans, et al., "Fabrication and characterization of an all-solid 2D photonic bandgap fiber with a low—loss region (< 20 dB/km) around 1550 nm", Optics Express, Oct. 2005, pp. 8452-8459, vol. 13, No. 21.

(Continued)

*Primary Examiner* — Yuanda Zhang
(74) *Attorney, Agent, or Firm* — Sughrue Mion, PLLC

(57) ABSTRACT

This fiber laser is provided with: a signal light source that outputs a signal light; a rare earth-doped fiber that amplifies and outputs the signal light from the signal light source; a Raman amplifying fiber that is routed as a portion of an optical transmission path in order to output the output light from the rare earth-doped fiber to an outside thereof; and a wavelength selecting element that is provided in the optical transmission path from the Raman amplifying fiber to the signal light source and does not allow transmission of a Stokes light that is generated in the Raman amplifying fiber.

5 Claims, 6 Drawing Sheets

(56) References Cited

FOREIGN PATENT DOCUMENTS

| | | |
|---|---|---|
| JP | 2004163558 A | 6/2004 |
| JP | 3567233 B2 | 9/2004 |
| JP | 2005-102107 A | 4/2005 |
| JP | 4637306 B | 8/2007 |
| JP | 2007221037 A | 8/2007 |
| WO | 97/26688 A2 | 7/1997 |

OTHER PUBLICATIONS

Notice of Reasons for Rejection dated Dec. 6, 2011 issued by the Japanese Patent Office in corresponding Japanese Application No. 2008-557172.

* cited by examiner

US 8,548,013 B2

FIBER LASER

CROSS REFERENCE TO RELATED APPLICATION

This application is a Continuation Application of International Patent Application No. PCT/JP2008/052168, filed on Feb. 8, 2008, which claims priority on Japanese Patent Application No. 2007-30274, filed Feb. 9, 2007, and Japanese Patent Application No. 2007-216473, filed Aug. 22, 2007, the contents of which are incorporated herein by reference.

TECHNICAL FIELD

The present invention relates to improvement in the laser oscillation characteristics of a fiber laser and the characteristic fluctuation with respect to return light, and conventionally this type of laser is utilized for cutting and piercing processing and surface printing (marking) of metal and plastic and the like, for example.

Priority is claimed on Japanese Patent Application No. 2007-30274, filed Feb. 9, 2007, and Japanese Patent Application No. 2007-216473, filed Aug. 22, 2007, the contents of which are incorporated herein by reference.

BACKGROUND ART

A fiber laser is utilized as a laser that is used in cuffing and piercing processing and surface printing (marking) of metal and plastic and the like. Patent Document 1 discloses in detail a method of using such a fiber laser.

FIG. 5 is a drawing that shows the basic construction of the fiber laser disclosed in Patent Document 1. This fiber laser multiplexes light of a signal light source Is (pulsed light) and a pumping light source Ps (CW light) with a BS and inputs each to a rare earth-doped double clad fiber 1, and as a result a high power pulsed amplified light with an output pulse peak power of several hundred to several MW is obtained.

Also, Patent Document 2 discloses in detail a method of using Stokes light of stimulated Raman scattering by pulsed light. FIG. 6 is a block diagram that shows an optical pulse generator 2 that uses Stokes light of Raman scattering described in Patent Document 2. This optical pulse generator 2 inputs pulsed light of 1 kW that is output from a 1.32 μm wavelength Nd:YAG laser 3 into an optical fiber 4 with a length of 1.7 km, takes out with a spectrometer 5 only the second Stokes light (wavelength of 1.49 μm) among the generated Stokes lights (refer to FIG. 7), and obtains an output of approximately 1 W.

[Patent Document 1] Japanese Patent, Publication No. 3567233
[Patent Document 2] Japanese Unexamined Patent Application, First Publication No. S58-70140
[Patent Document 3] Japanese Patent, Publication No. 2753539
[Non-Patent Document 1] G. Bouwmans, "Fabrication and characterization of an all solid 2D photonic bandgap fiber with a low loss region (<20 dB/km) around 1550 nm", OPTICS EXPRESS 17, Vol. 13, No. 21, 2005, pp 8,452-8,459.

DISCLOSURE OF INVENTION

Problems to be Solved by the Invention

A conventional fiber laser as shown in FIG. 8 is provided with a rare earth-doped fiber 10 that is an optical amplifying medium, an optical multiplexer 13 that is provided at the input of this rare earth-doped fiber 10, and an optical pulse generator 11 and a pumping light source 12 that are provided as a signal light source so that the lights thereof can be made incident on the rare earth-doped fiber 10 by the optical multiplexer 13. The pulse that is output from the optical pulse generator 11, by passing through the optical multiplexer 13, is made incident on the rare earth-doped fiber 10, and by the pumping light from the pumping light source 12 that simultaneously is input through the optical multiplexer 13, is amplified in the rare earth-doped fiber 10 and output as a high peak power pulse. In the case of this kind of constitution, when the pulsed light is radiated onto a workpiece 14 such as metal that reflects the output light with high efficiency, the problem arises in that a portion of the reflected light being re-coupled in the rare earth-doped fiber 10 and amplified while progressing in the reverse direction and causing damage to the optical pulse generator 11.

Moreover, Patent Document 3 discloses a construction in which an optical isolator is attached to the output portion of optical amplifier. Referring to this constitution, if as shown in FIG. 9 a constitution is made that installs an optical isolator 15 on the output side of the rare earth-doped optical fiber 10, the reflected light from the workpiece 14 such as metal is blocked by the optical isolator 15, and as a result it is possible to protect the optical pulse generator 11. However, Patent Document 3 makes no disclosure of suppressing the reflected light from the workpiece by the optical isolator.

However, in recent years, as improvements in fiber lasers have been continued, output exceeding 1 W as an average power has become possible, giving rise to the problem of durability of optical isolators against the optical input power. To realize an optical isolator that is capable of withstanding high optical power, it is necessary to make improvements in the surface coating process of optical components in the optical isolator and make improvements such as suppression of heat generation of each portion, which has a significant impact on the cost as a laser product.

The present invention was made in view of the above circumstances, and has an object of providing a fiber laser that has the function of being able to suppress damage to a light source by return light even with high optical power.

DISCLOSURE OF THE INVENTION

In order to achieve the above object, a first aspect of the present invention provides a fiber laser which includes: a signal light source that outputs a signal light; a rare earth-doped fiber that amplifies and outputs the signal light from the signal light source; a Raman amplifying fiber that is routed as a portion of an optical transmission path in order to output the output light from the rare earth-doped fiber to an outside thereof, and a wavelength selecting element that is provided in the optical transmission path from the Raman amplifying fiber to the signal light source and does not allow transmission of a Stokes light that is generated in the Raman amplifying fiber.

In the fiber laser of the first aspect of the present invention, it is preferred that the signal light source is a fiber laser.

In the fiber laser of the first aspect of the present invention, it is preferred that the signal light source is a Q-switch pulsed light source.

A second aspect of the present invention provides a fiber laser including: a signal light source that outputs a signal light; a rare earth-doped fiber that amplifies and outputs the signal light from the signal light source; a Raman amplifying fiber that is routed as a portion of an optical transmission path that guides the output light from the signal light source to one end of the rare earth-doped fiber; and a wavelength selecting element that is provided in the optical transmission path from the Raman amplifying fiber to the signal light source and does not allow transmission of a Stokes light that is generated in the Raman amplifying fiber.

Also, a third aspect of the present invention provides a fiber laser including: a signal light source that outputs a signal light; a Raman amplifying fiber that is routed as a portion of an optical transmission path in order to output the output light from the signal light source to the outside; and a wavelength selecting element that is provided in the optical transmission path from the Raman amplifying fiber to the signal light source and does not allow transmission of a Stokes light that is generated in the Raman amplifying fiber.

In the fiber laser of the present invention, it is preferred that the Raman amplifying fiber is a photonic band gap fiber, and the photonic band gap fiber does not include the wavelength of a second-order Stokes light of the signal light.

Also, in the fiber laser of the present invention, it is preferred that the rare earth-doped fiber is a rare earth-doped double clad fiber.

EFFECT OF THE INVENTION

The fiber laser of the present invention has a construction in which a Raman amplifying fiber is connected to at least one of the input side and the output side of a rare earth-doped fiber, and a wavelength selecting element that takes out Stokes light to which a return light input to the Raman amplifying fiber has been wavelength converted is provided on the light source side of the Raman amplifying fiber, so that when output light is reflected by a workpiece made of metal or the like and input to the Raman amplifying fiber, this return light is wavelength-converted in the Raman amplifying fiber to become Stokes light, and the Stokes light that is output from the Raman amplifying fiber is taken out of the optical amplifying system by the wavelength selecting element, and thereby it is possible to prevent the light source from being damaged by the amplified return light and possible to extend the service life of the fiber laser.

DESCRIPTION OF REFERENCE NUMERALS

20, 30, 40, 50, 60, 70 fiber laser; 21 rare earth-doped fiber; 22 optical pulse generator (signal light source); 23 pumping light source; 24 Raman amplifying fiber; 25 wavelength multiplexer/demultiplexer (wavelength selecting element); 26 optical multiplexer; 27 resonator; 28A, 28B mirrors; 52 continuous light generator; 64 PBGF.

BEST MODE FOR CARRYING OUT THE INVENTION

Embodiments of the present invention will be described hereinbelow with reference to the appended drawings. Note that the present invention is not restricted to the embodiments below, and for example the constituent elements of these embodiments may be suitably combined.

Figure 1:
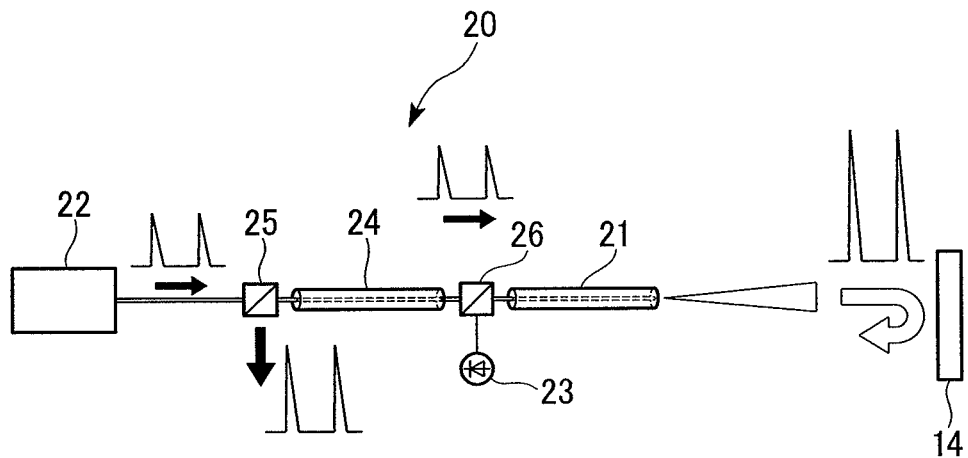
FIG. 1 is a block diagram that shows a first embodiment of a fiber laser of the present invention.
Figure 9:
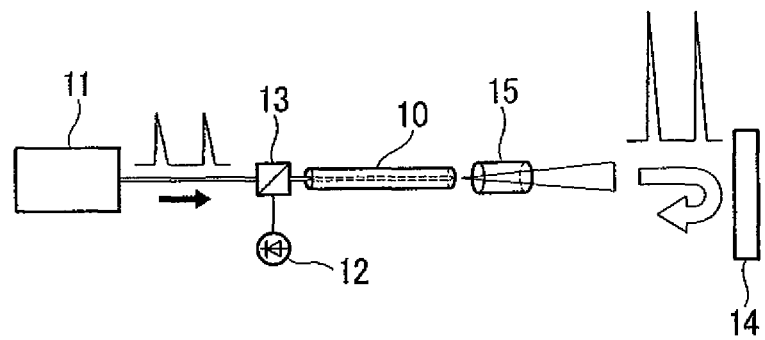
FIG. 9 is a block diagram of a fiber laser that uses an optical isolator for blocking return light.

FIG. 1 is a drawing that shows a first embodiment of the fiber laser of the present invention. A fiber laser 20 of the present embodiment is constituted with: a rare earth-doped fiber 21 that is an optical amplifying medium; an optical pulse generator 22 serving as a signal light generator that is connected so that a signal light can be incident on the input side of the rare earth-doped fiber; a pumping light source 23 that is connected so that a pumping light can be incident on the input side of the rare earth-doped fiber via an optical multiplexer 26; a Raman amplifying fiber 24 that is provided between the optical multiplexer 26, which is provided at the input side of the rare earth-doped fiber 21, and the optical pulse generator 22; and a wavelength multiplexer/demultiplexer 25 that is provided on the optical pulse generator 22 side of the Raman amplifying fiber 24 and that serves as a wavelength selecting element in which return light that is input to the Raman amplifying fiber 24 is wavelength-converted to Stokes light and taken out of the optical amplifying system. Also, an optical isolator 15 that is used in a conventional apparatus shown in FIG. 9 is not used.

In the fiber laser 20 of the present embodiment, as the rare earth-doped fiber 21 that is an optical amplifying medium, it is preferred to employ a rare earth-doped double clad fiber that includes a core that is doped with a rare earth element such as ytterbium (Yb), erbium (Er), thulium (Tm), neodymium (Nd), praseodymium (Pr) or the like, a first clad that surrounds the periphery of the core, and a second clad that surrounds the first clad. In this rare earth-doped double clad fiber, a signal light that is emitted from the optical pulse generator 22 is made incident on the core, and the pumping light from the pumping light source 23 is made incident onto the first clad. This pumping light pumps rare earth ions in the core, and the pumped rare earth ions amplify the signal light that has been made incident on the core. The signal light propagates through the rare earth-doped double clad fiber while being amplified, and is output as amplified pulsed light to the outside.

Next, the Raman amplifying fiber 24 that is provided between the input side of the rare earth-doped fiber 21 and the optical pulse generator 22 will be described. The Raman amplifying fiber 24 according to the present embodiment is a fiber that produces stimulated Raman scattering when return light having a large optical power is input, and it is possible to use a Raman amplifying fiber appropriately selected from conventional publicly known Raman amplifying fibers without being particularly limited. The core diameter and length of this Raman amplifying fiber 24 are determined according to the optical power of the return light.

The signal light from the pulse generator 22 enters the Raman amplifying fiber 24 via the wavelength multiplexer/demultiplexer 25. On the other hand, a portion of the output light with a large optical power that is amplified in the rare earth-doped fiber 21 is reflected by a workpiece 14 and again enters the rare earth-doped fiber 21. This return light is amplified in the rare earth-doped fiber 21 and enters the Raman amplifying fiber 24 as return light with a large optical power. The optical power of this return light is greater than the signal light. That is, the core diameter and length of this Raman amplifying fiber 24 are determined so as to allow the signal light with weak optical power to propagate as is without producing stimulated Raman scattering in it but to cause stimulated Raman scattering in return light with a large optical power.

In the fiber laser 20 of the present embodiment, the wavelength multiplexer/demultiplexer 25 as a wavelength selecting element provided between Raman amplifying fiber 24 and the optical pulse generator 22, which is a light source, may for example have a function that on the one hand transmits (or reflects) signal light that is emitted from the optical pulse generator 22 and inputs it to the Raman amplifying fiber 24 and on the other hand reflects (or transmits) the wavelength-converted return light (Stokes light) that is heading from the Raman amplifying fiber 24 to the optical pulse generator 22 to be removable to outside the optical amplifying system, and it is preferred to use one by selecting from among conventional publicly known wavelength multiplexers/demultiplexers that is capable of sufficiently separating the signal light and the Stokes light, whose wavelengths respectively differ.

In the fiber laser 20 of present embodiment, the optical multiplexer 26 provided between the Raman amplifying fiber 24 and the rare earth-doped fiber 21 should be able to input the signal light from the optical pulse generator 22 and the pumping light from the pumping light source 23 into the rare earth-doped fiber 21, and it is possible to use various kinds of conventional publicly known optical multiplexors.

Also, as the optical pulse generator 22 which is a light source, being a fiber laser is preferred, and being a Q-switch pulsed light source is particularly preferred.

Also, the light source need not necessarily be a light source that emits pulsed light, and it is possible to use a light source that emits continuous light.

The fiber laser 20 of the present embodiment constituted as described above inputs the pumping light from the pumping light source 23 into the rare earth-doped fiber 21 via the optical multiplexer 26 and inputs the signal light from the optical pulse generator 22 into the rare earth-doped fiber 21 through the wavelength multiplexer/demultiplexer 25, the Raman amplifying fiber 24, and the optical multiplexer 26, whereby the signal light propagates while being amplified so that amplified high power pulsed light will be output. Then, it is utilized as a fiber laser that irradiates the high power pulsed light that has been output onto a predetermined location of the workpiece 14, and performs cutting and piercing processing or processing such surface printing (marking).

In the case of the workpiece 14 being metal or the like, a portion of the high power pulsed light that is irradiated may be reflected by the workpiece 14 and be input as return light to the output side of the rare earth-doped fiber 21. When return light is input to the Raman amplifying fiber 24 through the rare earth-doped fiber 21 and the optical multiplexer 26 and propagates toward the side of the optical pulse generator 22, stimulated Raman scattering occurs and Stokes lights is generated with a wavelength different from the signal light. The Stokes light that is wavelength-converted is output from the light source side of the Raman amplifying fiber 24, and enters the wavelength multiplexer/demultiplexer 25, where it is reflected and taken out of the optical amplifying system.

In this way, in the fiber laser 20 of the present embodiment, when the output light is reflected by the workpiece 14 such as metal or the like and enters the Raman amplifying fiber 24, this return light is wavelength-converted in the Raman amplifying fiber 24 to become Stokes light, and the Stokes light that has been output from the Raman amplifying fiber 24 is taken out of the optical amplifying system by the wavelength multiplexer/demultiplexer 25. Thereby, it is possible to prevent the light source from being damaged by amplified return light, and it is possible to prolong the life of the fiber laser.

Figure 2:
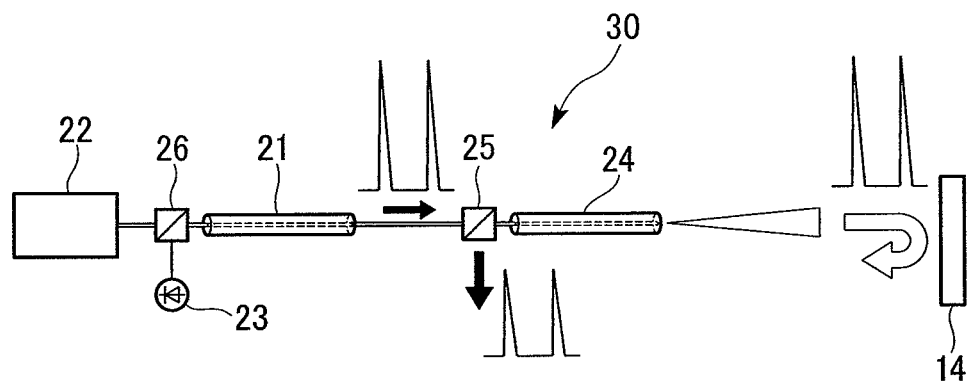
FIG. 2 is a block diagram that shows a second embodiment of the fiber laser of the present invention.

FIG. 2 is a drawing that shows a second embodiment of the fiber laser of the present invention. A fiber laser 30 of the present embodiment is constituted with the same constituent elements as the fiber laser 20 of the first embodiment described above, and so the same constituent elements shall be denoted by the same reference numerals.

The fiber laser 30 of the present embodiment differs from the fiber laser 20 of the first embodiment on the point of arranging the rare earth-doped fiber 21 on the side of the optical pulse generator 22, and providing the wavelength multiplexer/demultiplexer 25 and the Raman amplifying fiber 24 on the output side of the rare earth-doped fiber 21.

The Raman amplifying fiber 24 according to the present embodiment is a fiber that produces stimulated Raman scattering when return light of the rare earth-doped fiber 21 having a large optical power is input, and it is possible to use a Raman amplifying fiber appropriately selected from conventional publicly known Raman amplifying fibers without being particularly limited. The core diameter and length of this Raman amplifying fiber 24 are determined according to the optical power of the return light of the rare earth-doped fiber 21.

Even in the fiber laser 30 of the present embodiment, similarly the fiber laser 20 of the first embodiment, a signal light that is emitted from the optical pulse generator 22 is amplified in the rare earth-doped fiber 21. And when the amplified high power signal light propagates through the Raman amplifying fiber 24 toward the emission end, it is converted to Stokes light by the stimulated Raman scattering and output. This output light is reflected by a workpiece 14 and again enters the Raman amplifying fiber 24. Since this return light is wavelength-converted Stokes light, it propagates through the Raman amplifying fiber 24 and, upon entering the wavelength multiplexer/demultiplexer 25, is reflected and taken out of the optical amplifying system.

The fiber laser 30 of the present embodiment thus can obtain the same effects as the fiber laser 20 of the first embodiment described above.

Figure 3:
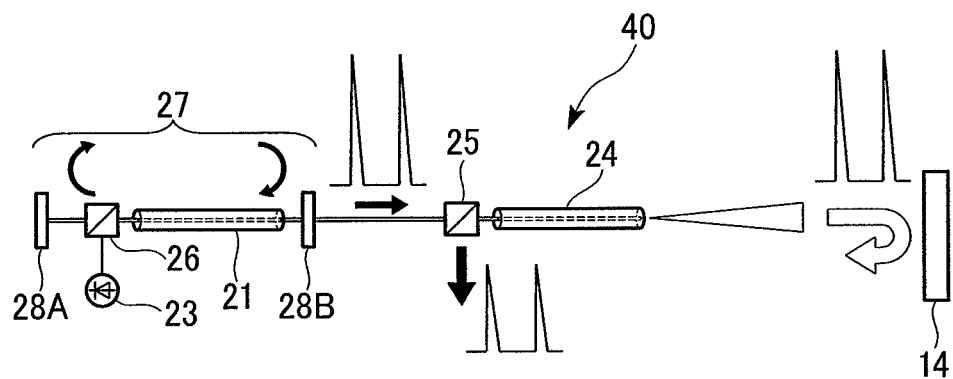
FIG. 3 is a block diagram that shows a third embodiment of the fiber laser of the present invention.

FIG. 3 is a drawing that shows a third embodiment of the fiber laser of the present invention. A fiber laser 40 of the present embodiment is constituted by being provided with a rare earth-doped fiber 21 that is an optical amplifying medium, a pumping light source 23 that is connected so that light can be incident on the input side of the rare earth-doped fiber 21 via an optical multiplexer 26, mirrors 28A, 28B that are provided at both ends of the rare earth-doped fiber 21 so as to cause the rare earth-doped fiber 21 to function as a resonator 27, a Raman amplifying fiber 24 connected to the output side of the rare earth-doped fiber 21, and a wavelength multiplexer/demultiplexer 25 provided on the rare earth-doped fiber 21 side of the Raman amplifying fiber 24.

The fiber laser 40 of the present embodiment inputs light from the pumping light source 23 into the input side of the rare earth-doped fiber 21 via the optical multiplexer 26, whereby the light is amplified by the resonator 27 that includes the rare earth-doped fiber 21 and the mirrors 28A, 28B that are provided on both sides thereof, and the amplified high power light is output through the mirror 28B, the wavelength multiplexer/demultiplexer 25 and the Raman amplifying fiber 24, so as to be able to be irradiated onto a workpiece 14.

In the fiber laser 40 of the present embodiment, similarly to the fiber laser 30 of the second embodiment described above, when the high power signal light that was amplified within the rare earth-doped fiber 21 propagates through the Raman amplifying fiber 24 toward the emission end, it is converted to Stokes light by the stimulated Raman scattering and output. This output light is reflected by the workpiece 14 and again enters the Raman amplifying fiber 24. Since this return light is wavelength-converted Stokes light, it propagates through the Raman amplifying fiber 24 and, upon entering the wavelength multiplexer/demultiplexer 25, is reflected and taken out of the optical amplifying system.

The fiber laser 40 of the present embodiment thus can obtain the same effects as the fiber laser 20 of the first embodiment described above.

EXAMPLE 1

The fiber laser 20 with the constitution shown in FIG. 1 was manufactured.

Figure 4:
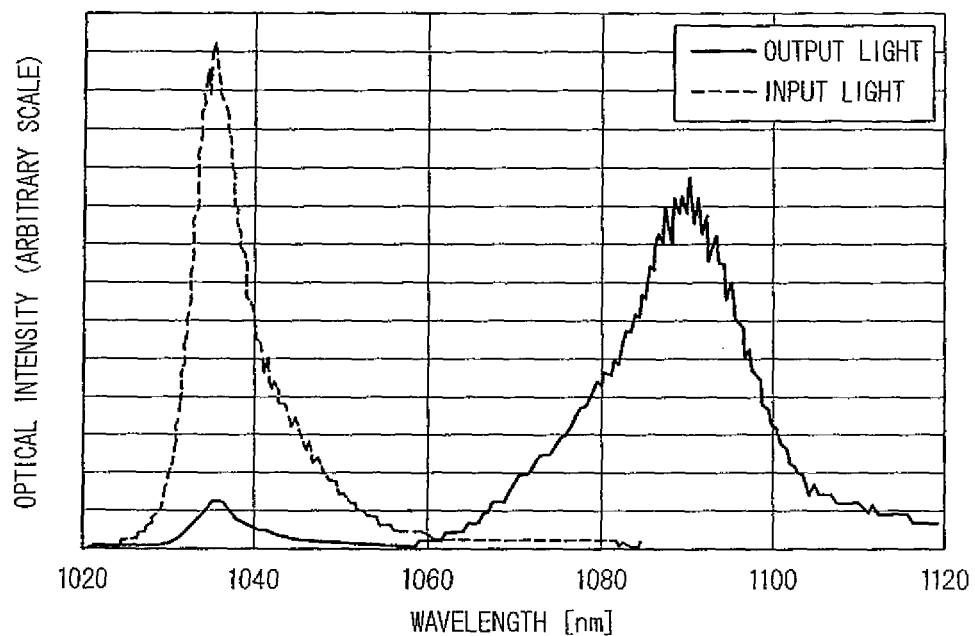
FIG. 4 is a graph that shows the result of wavelength conversion by the Raman amplifying fiber used in an Example 1 of the present invention.
Figure 5:
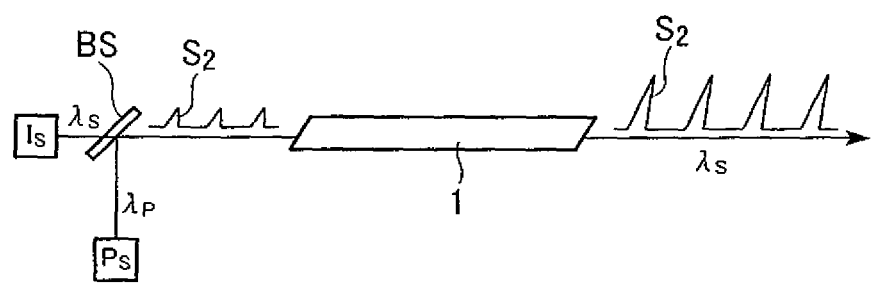
FIG. 5 is a block diagram that shows a conventional fiber laser disclosed in Patent Document 1.
Figure 6:
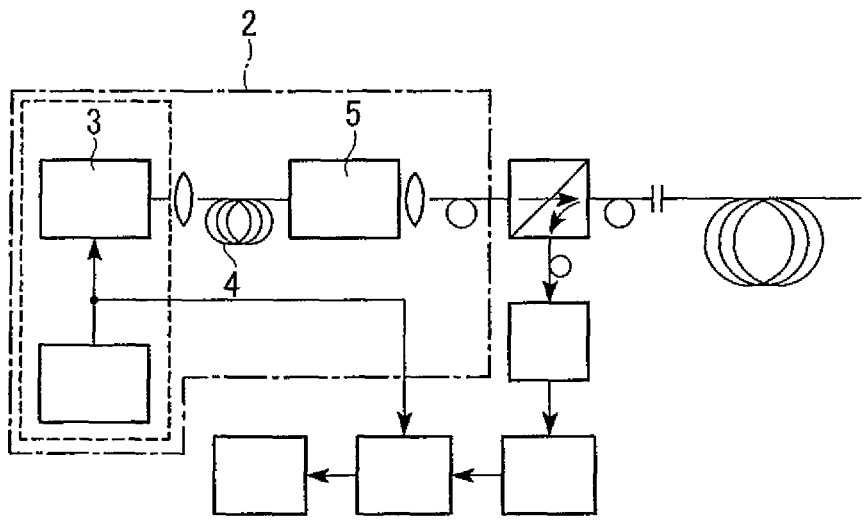
FIG. 6 is a block diagram that shows a conventional fiber laser disclosed in Patent Document 2.

As the Raman amplifying fiber 24, a fiber with a core diameter of 4 μm and a clad diameter of 125 μm was used. A light pulse (wavelength of 1030 nm, peak power of 80 W) emitted from the optical pulse generator 22 was input into this Raman amplifying fiber 24. On the other side, it was reflected by the workpiece and the return light amplified within the rare earth-doped fiber 21 had a peak power of 160 W when entering the Raman amplifying fiber 24. The Raman amplifying fiber 24 has a length of 50 m so that stimulated Raman scattering does not occur in the light pulse emitted from the optical pulse generator 22, while a wavelength shift due to stimulated Raman scattering occurs only in the return light pulse. When the return light with a high peak power amplified within the rare earth-doped fiber 21 propagates through the Raman amplifying fiber 24 toward the optical pulse generator 22, it causes stimulated Raman scattering. FIG. 4 shows the spectrums of the return light that has entered this Raman amplifying fiber 24 and the stimulated Raman scattering generated by this return light.

As shown in FIG. 4, the optical power of wavelength 1030 nm that is input is output with a shift to wavelength 1090 nm by the stimulated Raman scattering.

As shown in FIG. 1, the pumping light source 23 is one that couples output light of a semiconductor laser to a multi-mode fiber, and light with a wavelength of 915 nm and power of 3 W can be output from the fiber.

The optical multiplexer 26 is an element for effectively combining signal light and pumping light in the core and clad of a Yb core-doped double clad fiber used as the rare earth-doped fiber 21, and it is capable of coupling light from six semiconductor lasers used as the pumping light source 23 and light from a Raman amplifying fiber with low loss.

After passing this element, although the pulsed light power falls by 1 dB, pumping light power of 18 W is obtained, receiving hardly any loss.

As the rare earth-doped fiber 21, a Yb core-doped double clad fiber is used with a core diameter of 14 μm, clad diameter of 200 μm, length of 10 m, and Yb doping concentration to the core of 10000 ppm. By amplification of the pulsed light by this fiber, a pulsed laser light with a pulse peak power of 10 kW and an average output power of 10 W is output.

A convex lens with a numerical aperture (NA) of 0.4 was installed near the fiber output end, and hole-processing was performed on a stainless steel material with a mirror finished surface.

With the condensing spot diameter of the pulsed light on the stainless steel material surface around 200 μm, there is no particular change in the operation of the laser, but when the condensing spot diameter is narrowed to 100 μm or less, the return light amount clearly increases, and a temperature increase (about 3° C.) of the wavelength multiplexer/demultiplexer 25 considered to be due to the return light is observed. However, the operation of the optical pulse generator 22 is not affected at all, and all the return light is suppressed within the wavelength multiplexer/demultiplexer 25.

EXAMPLE 2

Figure 10:
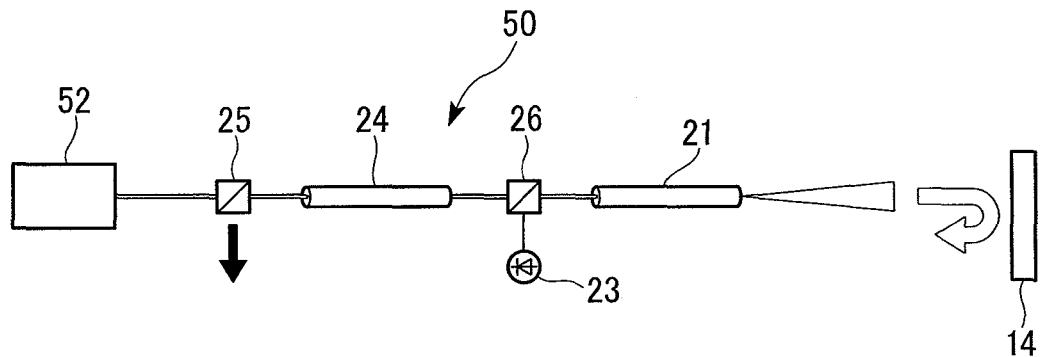
FIG. 10 is a block diagram of the fiber laser manufactured in an Example 2 of the present invention.

The fiber laser 50 having the constitution shown in FIG. 10 was manufactured using a continuous light generator 52 instead of the pulse generator 22 of the fiber laser of Example 1 shown in FIG. 1. Also, 19 semiconductor lasers capable of an output of 8 W were used per one pumping light source 23, and pumping light power of 150 W after passing through the optical multiplexer 26 was obtained, and on the output side of the rare earth-doped fiber 21, CW laser light with an average output power of 80 W was obtained.

A convex lens with a numerical aperture (NA) of 0.4 was installed near the fiber output end at which this CW laser light is output, and hole processing was performed on a stainless steel material with a mirror finished surface.

Similarly to the case of Example 1, when the condensing spot diameter is narrowed to 100 μm or less, a temperature increase (about 15° C.) of the wavelength multiplexer/demultiplexer 25 due to the return light is observed. However, the return light is suppressed within the wavelength multiplexer/demultiplexer, with no effect seen on the operation of the optical pulse generator 22 and the output of the rare earth-doped fiber 21.

EXAMPLE 3

Figure 7:
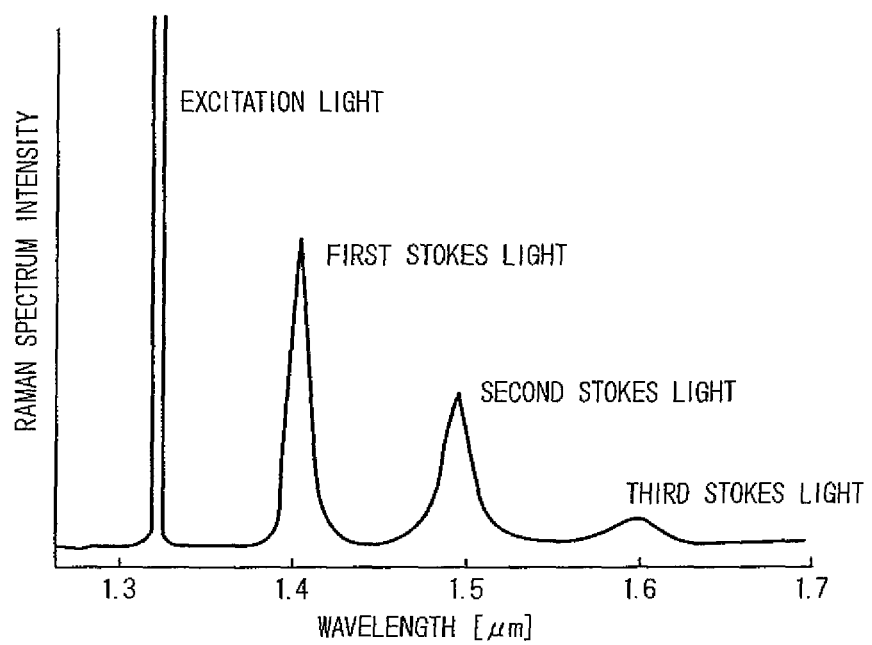
FIG. 7 is a drawing that shows the wavelength of the pumping light and the Stokes light disclosed in Patent Document 2.
Figure 8:
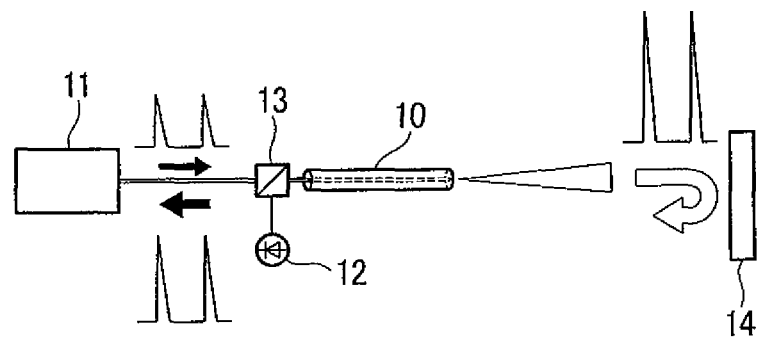
FIG. 8 is a block diagram that shows a conventional ordinary fiber laser.

In the fiber laser of Example 1 shown in FIG. 1, when the return light reflected by the workpiece 14 is input to the Raman amplifying fiber 24 and propagates toward the optical pulse generator 22, stimulated Raman scattering occurs, whereby Stokes light having a wavelength which is different from that of the signal light is generated. However, the power of the signal light is not completely converted to the Stokes light, but a portion thereof is output from the Raman amplifying fiber 24 as is with the signal light wavelength; therefore, it is not possible to completely remove the return light by the wavelength multiplexer/demultiplexer 25. Also, due to the power of the return light, high order Stokes light as shown in FIG. 7 occurs, leading to higher performance being required for the wavelength multiplexer/demultiplexer, which ends up impacting the cost of the fiber laser.

Figure 13:
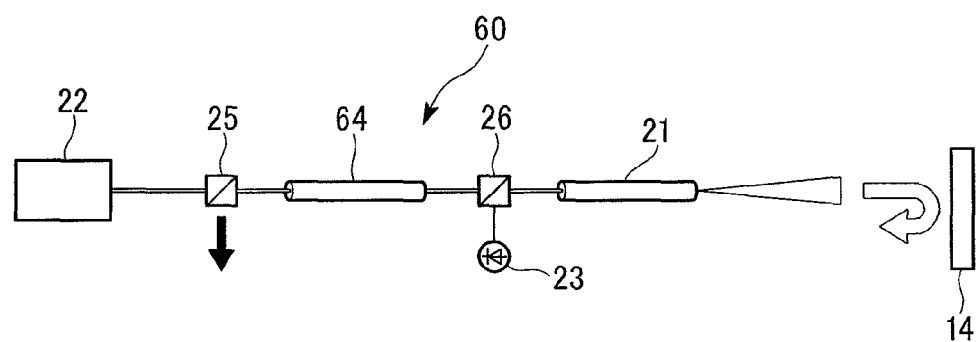
FIG. 13 is a block diagram of the fiber laser manufactured in an Example 3 of the present invention.

Therefore, in the present example, a fiber laser 60 shown in FIG. 13 was manufactured using a photonic band gap fiber (PBGF) 64 as the Raman amplifying fiber 24 of the fiber laser of Example 1 shown in FIG. 1. The PBGF 64 is for example disclosed in Non-Patent Document 1.

Figure 11:
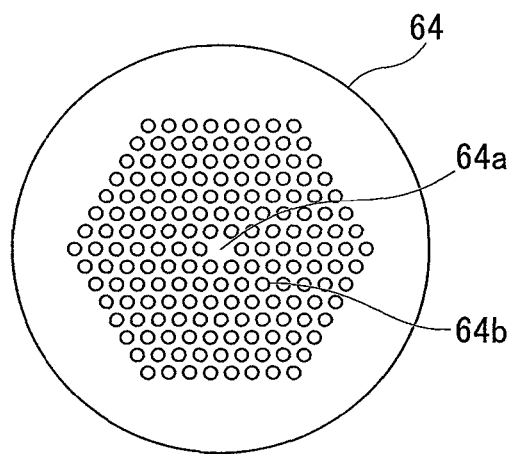
FIG. 11 is a cross-sectional view of a photonic band gap fiber used in Examples 3 and 4 of the present invention.
Figure 12:
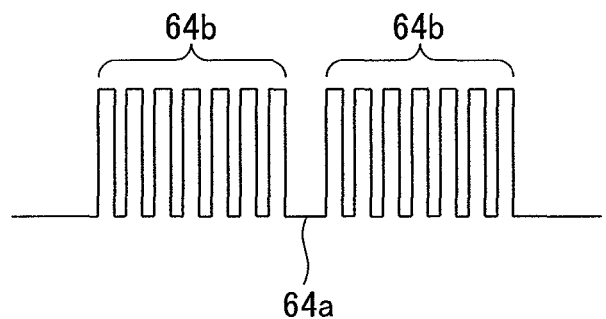
FIG. 12 is a refraction profile in the radial direction of the photonic band gap fiber used in the Examples 3 and 4 of the present invention.

FIG. 11 shows a cross section of the PBGF 64 used in the present example, and FIG. 12 shows the refraction profile in the radial direction thereof. This PBGF 64 has in the center a low refractive index region 64a that is the same as that of pure silica glass, and in the periphery thereof a high refractive index portion 64b is formed by adding germanium and the like, with this high refractive index portion arranged with a triangular grid-like cyclic structure. By adjusting the diameter and interval of the high refractive index portion, it is possible to form the photonic band gap in a desired wavelength band. When light is input to the low refractive index region 64a of this PBGF 64, since the light of the photonic band gap wavelength band cannot be wave-guided through the high refractive index portion 64b that is arranged with a cyclic structure, it is wave-guided by being confined to the low refractive index region 64a. This differs from the optical fiber used in conventional optical communications and the like in terms of the waveguide principle. Since light of other wavelength bands can be waveguided through the cyclic structure, it spreads out and is radiated over the entire fiber area. That is, it becomes an optical fiber in which the low refractive index region functions as the core and the high refractive index region functions as the clad for light of the photonic band gap wavelength region.

The present example uses the PBGF 64 that is manufactured so that the both wavelength bands of the return light (signal light) and the first-order Stokes light thereof are included in the photonic band gap, and the wavelength band of the second-order Stokes light becomes outside the photonic band gap. By using this PBGF 64 as a Raman amplifying fiber, the return light and the first-order Stokes light thereof propagate while confined to the core region, and the second-order Stokes light that is generated by the first-order Stokes light undergoing Raman scattering is, without propagating through the core region, released to outside of the core region prior to being subject to stimulated Raman scattering. Thereby, it is possible to efficiently perform wavelength conversion from the return light to first-order Stokes light, and it is possible to remove the return light with good efficiency. Also, since the wavelength multiplexer/demultiplexer may take out only the wavelength of the first-order Stokes light to outside of the amplifying system, it is possible to use comparatively low-cost components.

Similarly to Example 1, a convex lens with a numerical aperture (NA) of 0.4 was installed near the fiber output end that outputs a pulsed laser light with an average output power of 10 W, and hole processing was performed on a stainless steel material with a mirror-finished surface.

With the condensing spot diameter of the pulsed light on the stainless steel material surface around 200 μm, there is no particular change in the operation of the laser. However, when the condensing spot diameter is narrowed to 100 μm or less, the return light amount clearly increases, and a temperature increase (about 5° C.) of the wavelength multiplexer/demultiplexer 25 considered to be due to the return light is observed. However, the operation of the optical pulse generator 22 is not affected at all, and all the return light is suppressed within the wavelength multiplexer/demultiplexer 25. Also, the temperature rise of the wavelength multiplexer/demultiplexer 25 is higher than in Example 1, and since the return light in the PBGF 64 can be efficiently converted to first-order Stokes light, it is understood that the light that is removed to outside of the amplifying system by the wavelength multiplexer/demultiplexer 25 has increased.

EXAMPLE 4

Figure 14:
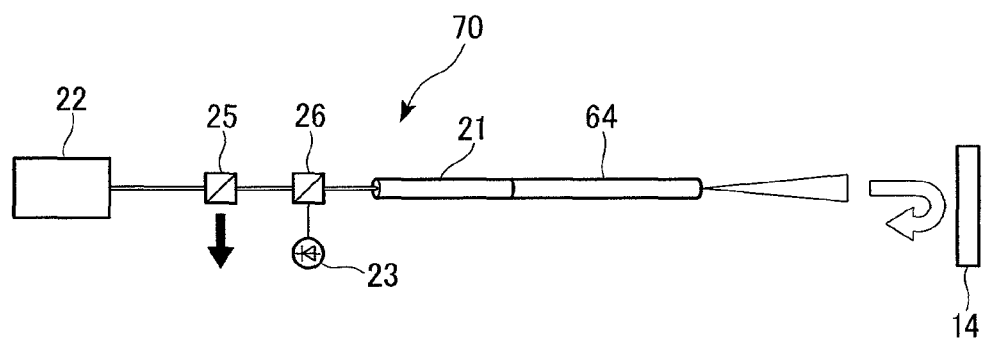
FIG. 14 is a block diagram of the fiber laser manufactured in the Example 3 of the present invention.

The fiber laser 70 shown in FIG. 14 was manufactured. The point of difference with the fiber laser 60 shown in FIG. 13 is that, by connecting the PBGF 64 to the output side of the rare earth-doped fiber 21, the laser light that emitted from the rare earth-doped fiber 21 and input to the PBGF 64 has, by the time of reaching the emission end of the PBGF 64, been converted to laser light of the first-order Stokes light wavelength by stimulated Raman scattering and then emitted. By adopting such a constitution, the return light comes to have only the wavelength portion of first-order Stokes light, and so it is possible to efficiently remove the return light.

Moreover, if a signal wavelength and the optical characteristics of the PBGF 64 are selected so that the wavelength of the laser light that is emitted from the PBGF 64 becomes outside the amplification band of the rare earth-doped fiber 21, the return light, while being amplified in a rare earth-doped optical fiber, will cease to propagate. Accordingly, since it is possible to reduce the power of the return light, it is possible to constitute a fiber laser having higher reliability.

In the present example, the signal light wavelength emitted from the pulse generator 22 was assumed to be 1090 nm, and the PBGF 64 was manufactured so that the signal light wavelength (1090 nm) and the first-order Stokes light thereof (wavelength of around 1145 nm) are included in the wavelength band of the photonic band gap and propagate in the core region of the PBGF 64. By constituting it in this way, laser light is obtained in which the wavelength from the emission end of the PBGF 64 is 1145 nm.

Similarly to Example 1, a convex lens with a numerical aperture (NA) of 0.4 was installed near the fiber output end that outputs a pulsed laser light adjusted so that the average output power becomes 10 W, and hole processing was performed on a stainless steel material with a mirror-finished surface.

In the condition of narrowing the condensing spot diameter to 100 μm or less, although the amount of return light clearly increases, a temperature increase of the wavelength multiplexer/demultiplexer 25 due to the return light was not observed. This is due to the fact that since the wavelength of the return light is 1145 nm, which is outside the amplification band of a Yb-doped optical fiber (rare earth-doped fiber 21), the return light is not amplified when propagating through the Yb-doped optical fiber, and so the power itself of the return light is reduced compared to the above examples. Also, all of the return light is suppressed within the wavelength multiplexer/demultiplexer 25, with absolutely no effect on the operation of the optical pulse generator 22.

The invention claimed is:

1. A fiber laser comprising:
a signal light source that outputs a signal light;
a rare earth-doped fiber that amplifies and outputs the signal light from the signal light source;
an optical multiplexer that is provided at an input side of the rare earth-doped fiber;
a pumping light source that is connected so that a pumping light is incident on the input side of the rare earth-doped fiber via the optical multiplexer;
a Raman amplifying fiber that is routed as a portion of an optical transmission path in order to output the output light from the rare earth-doped fiber to an outside of the rare earth-doped fiber, is provided between the signal light source and the optical multiplexer, and converts the output light emitted from the rare earth-doped fiber to a Stokes light by stimulated Raman scattering; and a wavelength selecting element that is provided in the optical transmission path from the Raman amplifying fiber to the signal light source, allows transmission of a light of a wavelength of the signal light, and takes the Stokes light out of the fiber laser, the Stokes light being a return light again entering the Raman amplifying fiber from the outside of the rare earth-doped fiber and which propagates through the optical transmission path toward the signal light source, wherein the Raman amplifying fiber converts the output light to the Stokes light after the output light passes through the wavelength selecting element.

2. The fiber laser according to claim 1, wherein the signal light source is a fiber laser.

3. The fiber laser according to claim 1, wherein the signal light source is a Q-switch pulsed light source.

4. The fiber laser according to claim 1, wherein the Raman amplifying fiber is a photonic band gap fiber, and the photonic band gap fiber does not include a wavelength of a second-order Stokes light of the signal light.

5. The fiber laser according to claim 1, wherein the rare earth-doped fiber is a rare earth-doped double clad fiber.

* * * * *